United States Patent
Subrahmanyan et al.

(10) Patent No.: US 7,212,599 B2
(45) Date of Patent: May 1, 2007

(54) JITTER AND WANDER REDUCTION APPARATUS

(75) Inventors: Ravi Subrahmanyan, Windham, NH (US); Jeffrey W. Spires, Plaistow, NH (US)

(73) Assignee: Applied Micro Circuits Corporation, San Diego, CA (US)

( * ) Notice: Subject to any disclaimer, the term of this patent is extended or adjusted under 35 U.S.C. 154(b) by 713 days.

(21) Appl. No.: 10/346,550

(22) Filed: Jan. 17, 2003

(65) Prior Publication Data

US 2003/0227988 A1   Dec. 11, 2003

Related U.S. Application Data

(60) Provisional application No. 60/351,594, filed on Jan. 25, 2002.

(51) Int. Cl.
*H04L 7/00* (2006.01)
*H04L 25/00* (2006.01)
*H04L 25/40* (2006.01)
*H03D 3/24* (2006.01)
*H04J 3/06* (2006.01)

(52) U.S. Cl. .............. 375/372; 375/371; 375/373; 370/516

(58) Field of Classification Search ........... 375/371–6, 375/226; 370/516; 702/69
See application file for complete search history.

(56) References Cited

U.S. PATENT DOCUMENTS

| | | | |
|---|---|---|---|
| 5,052,025 A | 9/1991 | Duff et al. | 375/118 |
| 5,200,982 A | 4/1993 | Weeber | 375/118 |

(Continued)

FOREIGN PATENT DOCUMENTS

DE   WO 99/49514   9/1999

Primary Examiner—David C. Payne
Assistant Examiner—Aslan Ettehadieh
(74) Attorney, Agent, or Firm—Weingarten, Schurgin, Gagnebin & Lebovici LLP (57) ABSTRACT

The present invention is for an apparatus that receives input data at a non-uniform first data rate carried by a system clock, and provides output data at a substantially uniform second data rate that is nominally equal to the first data rate and is also carried by the system clock. The system clock is faster than the first or second data rates and accordingly, a write enable signal controls the input data that is written into a saturating elastic store and a read enable signal controls the reading and output of data from the saturating elastic store. The saturating elastic store includes a plurality of storage locations and provides a storage fill level indicative of the amount of storage locations currently holding data. A digital filter receives the storage fill level and filters the storage fill level to provide a control word to a digitally controlled read enable signal generator. The digitally controlled read enable signal generator provides a read enable signal that is nominally the second data rate and that can be varied about the nominal second data rate in response to the control word. The digitally controlled read enable signal generator is able to vary the read enable signal rate by providing a plurality of stuff bit opportunities interspersed between the read enable signals. Some of these stuff bit opportunities are filled to set the read enable signal rate at the nominal second data rate value. By filling or not filling the stuff bit opportunities, the read enable signal rate can be adjusted over a narrow band of frequencies.

9 Claims, 6 Drawing Sheets

U.S. PATENT DOCUMENTS

| | | |
|---|---|---|
| 5,210,762 A | 5/1993 | Weeber et al. ............. 371/69.1 |
| 5,337,334 A | 8/1994 | Molloy ....................... 375/118 |
| 5,404,380 A | 4/1995 | Powell et al. ............... 375/363 |
| 5,548,534 A | 8/1996 | Upp ........................... 364/514 |
| 5,574,744 A | 11/1996 | Gaw et al. |
| 5,631,988 A | 5/1997 | Swirhun et al. |
| 5,748,569 A | 5/1998 | Teodorescu et al. ........ 368/118 |
| 5,768,456 A | 6/1998 | Knapp et al. |
| 5,771,218 A | 6/1998 | Feldman et al. |
| 5,796,796 A | 8/1998 | Wang ......................... 375/372 |
| 5,815,623 A | 9/1998 | Gilliland et al. |
| 5,835,543 A | 11/1998 | Mazzurco et al. .......... 375/372 |
| 6,014,476 A | 1/2000 | Meyer-Güldner et al. |
| 6,018,249 A | 1/2000 | Akram et al. |
| 6,034,808 A | 3/2000 | Isaksson |
| 6,056,448 A | 5/2000 | Sauter et al. |
| 6,088,413 A | 7/2000 | Autry et al. ................. 375/372 |
| 6,130,979 A | 10/2000 | Isaksson et al. |
| 6,137,929 A | 10/2000 | Rosenberg et al. |
| 6,227,720 B1 | 5/2001 | Isaksson |
| 6,243,508 B1 | 6/2001 | Jewell et al. |
| 6,246,708 B1 | 6/2001 | Thornton et al. |
| 6,252,919 B1 * | 6/2001 | Lin ............................ 375/377 |
| 6,302,590 B1 | 10/2001 | Moore |
| 6,318,909 B1 | 11/2001 | Giboney et al. |
| 6,349,159 B1 | 2/2002 | Uebbing et al. |
| 6,373,827 B1 * | 4/2002 | Tayebi et al. ............... 370/310 |
| 6,384,473 B1 | 5/2002 | Peterson et al. |
| 2001/0016023 A1 * | 8/2001 | Roy et al. ................... 375/372 |
| 2001/0021287 A1 | 9/2001 | Jewell et al. |
| 2002/0021874 A1 | 2/2002 | Giboney et al. |
| 2002/0144169 A1 * | 10/2002 | Ranganath et al. ......... 713/400 |

* cited by examiner

JITTER AND WANDER REDUCTION APPARATUS

CROSS REFERENCE TO RELATED APPLICATIONS

This application claims priority of U.S. Provisional Patent Application No. 60/351,594 filed Jan. 25, 2002 entitled JITTER AND WANDER REDUCTION APPARATUS.

STATEMENT REGARDING FEDERALLY SPONSORED RESEARCH OR DEVELOPMENT

N/A

BACKGROUND OF THE INVENTION

This invention relates to a data communications device and in particular to a jitter and wander reduction apparatus.

In a synchronous communications network, digital payload data is carried on a particular clock frequency within a synchronous message format. This payload data may include both asynchronous digital data and synchronous digital data originating at a different data rate in a foreign digital network. The Synchronous Optical Network (SONET) and its European counterpart the Synchronous Digital Hierarchy (SDH) provide a standard format of transporting digital signals having various data rates, such as a DS-0, DS-1, DS-1C, DS-2, or a DS-3 signal and their European counterparts within a Synchronous Payload Envelope (SPE), or a container that is a part of a SONET/SDH STS-N/STM-N message frame. In addition to the digital data that is mapped and framed within the SPE or container, the STS-N/STM-N message frame also includes transport and overhead data that provides for coordination between various network elements.

If the digital data that is mapped and framed in the STS-N/STM-N message was originally carried by a clock signal having a different frequency than the SONET/SDH line rate clock, certain adjustments to the framed digital data must be made. For example, if a DS-3 data signal, which is carried by a 44.736 MHz DS-3 clock signal is to be carried in a SONET/SDH fiber-optic network, the DS-3 signal is mapped into the higher rate SPE of an STS-1 message, and extra bits must be added to the DS-3 signal prior to transmission through the SONET/SDH network. These extra bits are commonly referred to as stuff bits and are merely place markers and in general carry no valid data. These gap bits are required because the DS-3 signal is slower than the SONET/SDH clock frequency so that there are not enough DS-3 bits at the higher frequency to form a complete SONET frame. More detail may be found in the Bellcore specification "SONET Transport Systems: Common Generic Criteria", GR-253-CORE, Issue 3, September 2000, the Bellcore specification "Transport Systems Generic Requirements (TSGR): Common Requirements", GR-499-CORE, Issue 2, December 1998, and the ITU-T Recommendation G.783, "Characteristics of Synchronous Digital Hierarchy (SDH) Equipment Functional Blocks", January 1994.

When the STS-1 message is received at a network exit node, the overhead bytes are removed from the SONET STS-1 message and replaced by gaps in the data stream. The payload data that remains is de-framed and de-mapped into a data stream carried by a higher clock frequency than the nominal original clock frequency of the payload data. Thus the stuff data that was inserted when the data was mapped into the SPE remains when the data stream is recovered from the SPE and is also replaced by gaps in the data stream. Thus, the recovered payload data contains gaps in the data stream remaining after the overhead bytes and stuff data bits have been removed. If, for example, DS-3 data has been transported via a SONET/SDH network, the DS-3 data must be converted from the SONET clock signal to the lower frequency DS-3 clock signal and the gap data bits must be removed prior to the DS-3 signal being B3ZS-encoded for electrical re-transmission.

To transfer data from one clock domain to another, for example from the DS-3 embedded within the SONET signal rate to the proper DS-3 signal rate, typically a desynchronizer is used to provide a buffering mechanism between the clock domains. A desynchronizer typically includes an elastic store first-in-first-out memory buffer that receives gapped data recovered from a synchronized data payload as an input at one clock frequency and stores the data in appropriate storage locations. Data is read from the elastic store buffer at a different clock frequency and is provided as output data at that frequency. This output data does not contain the gap data bits that were added when the slower signal was mapped into the faster SONET/SDH STS-1 message.

Once the data has been de-mapped and de-framed from the SPE and the gaps removed, a phase locked loop (PLL) is typically used to recover the clock information and to adjust the read signal associated with the data stored in the elastic store for transmission downstream as a data signal carried by a smooth clock signal.

However, not all applications require the extraction of the uniform PDH clock signal for output. For example, the PDH data coming from the de-mapper can be put into another SONET STS message or in some cases may be output without desynchronization. In these circumstances, the data can be carried by the SONET transport clock or a related clock used by the de-mapper. However, the non-uniformity of the data must be maintained within certain bounds that are specified by the standards listed above. One way to maintain the data within these standards is to fully desynchronize the data, even though the application may not require desynchronized data. Although this method will certainly work, the additional hardware expense of the full desynchronizer including a loop filter, VCXO, etc. will add to the overall expense of the system. In addition, some applications require a fully integrated system and since it is difficult to produce a fully integrated version of a VCXO, using a full desynchronizer is not a viable option.

Thus it would be advantageous to provide a system for processing a PDH payload extracted from the SPE without fully desynchronizing the resulting data stream and extracting a uniform PDH clock.

BRIEF SUMMARY OF THE INVENTION

The present invention is for an apparatus that receives input data at a non-uniform first data rate carried by a system clock, and provides output data at a substantially uniform second data rate that is nominally equal to the first data rate and is also carried by the system clock. The system clock is faster than the first or second data rates and accordingly, a write enable signal controls the input data that is written into an elastic store and a read enable signal controls the reading and output of data from the elastic store. The elastic store includes a plurality of storage locations and provides a storage fill level indicative of the amount of storage locations currently holding data. A digital filter receives the storage fill level and filters the storage fill level to provide a control word to a digitally controlled read enable signal generator. The digitally controlled read enable signal generator provides a read enable signal that is nominally the second data rate and that can be varied about the nominal second data rate in response to the control word. The digitally controlled read enable signal generator is able to vary the read enable signal rate by providing a plurality of stuff bit opportunities interspersed between the read enable signals. Some of these stuff bit opportunities are filled to set the read enable signal rate at the nominal second data rate value. By filling or not filling the stuff bit opportunities, the read enable signal rate can be adjusted over a narrow band of frequencies.

In one embodiment, an apparatus for receiving input data and a write enable signal at a non-uniform first data rate and for providing output data at a substantially uniform second data rate includes an elastic store having a plurality of data storage locations. The elastic store receives the input data and the write enable signal and is operative to store the input data that is concurrent with the write enable signal at one of said plurality of data storage locations. The elastic store also provides a data storage level signal indicative of the number of data storage locations currently used. A digital filter is coupled to the elastic store and receives the data storage level signal, and filters the data storage level to provide the filtered data storage level signal as an output control word. A digitally controlled read enable generator provides a read enable at the second data rate to the elastic store. The digitally controlled read enable generator receives the control word from the digital filter and varies the read enable signal about the second data rate in response to the control word. The digitally controlled read enable generator is coupled to the elastic store and provides the read enable signal to the elastic store. In response to the read enable signal, the elastic store reads data stored at one of the plurality of storage locations and provides the read data as an output.

Other features, functions, and aspects of the invention will be evident from the Detailed Description of the Invention that follows.

BRIEF DESCRIPTION OF THE SEVERAL VIEWS OF THE DRAWING

The invention will be more fully understood with reference to the following Detailed Description of the Invention in conjunction with the drawings of which.

DETAILED DESCRIPTION OF THE INVENTION

Figure 1:
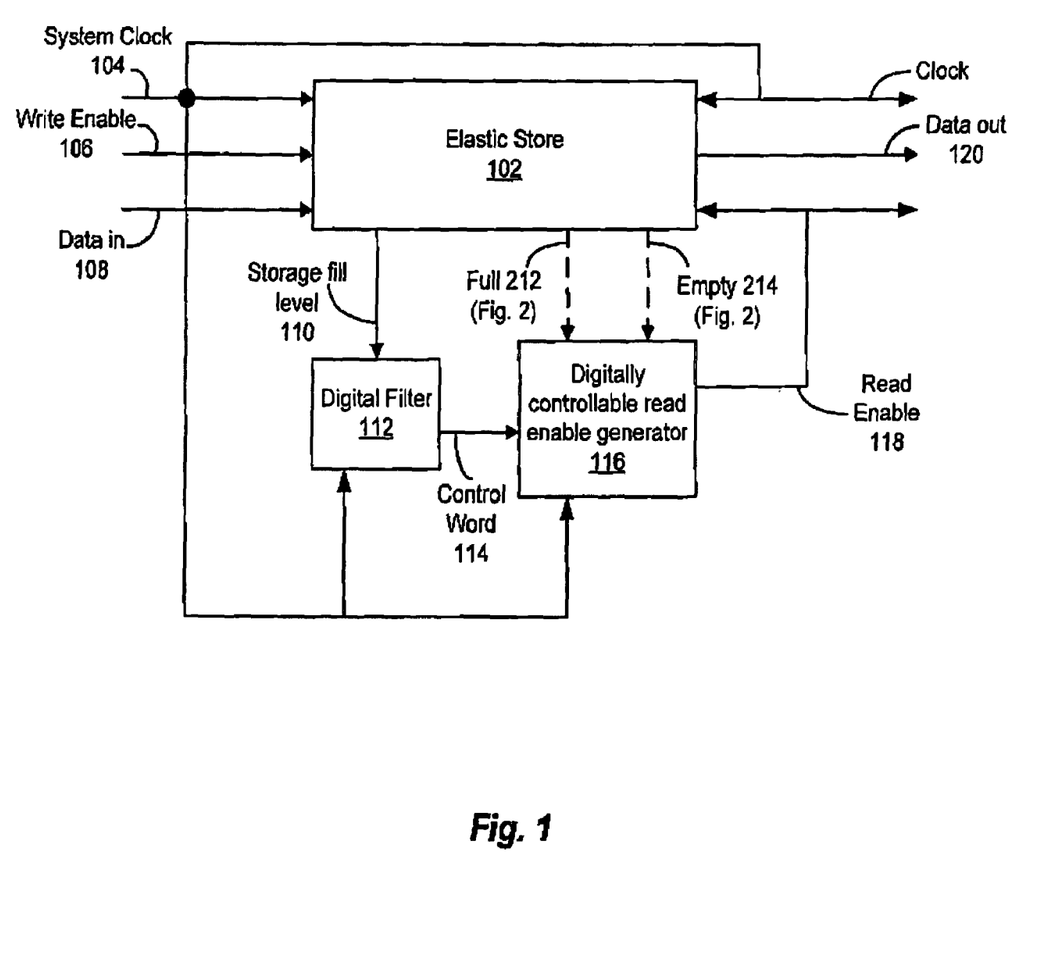
FIG. 1 is a block diagram of an embodiment of the present invention.

The present invention is for an apparatus that receives input data at a non-uniform first data rate carried by a system clock and provides output data at a substantially uniform second data rate that is nominally equal to the first data rate and is also carried by the system clock. Typically, the first and second data rates are slower than the system clock. In particular, FIG. 1 depicts an elastic store 102, a digital filter 112, and a digitally controllable read enable generator 116. The elastic store receives a system clock 104, a write enable signal 106 and a data input signal 108. In one embodiment, the write enable signal and the system clock may be generated by a de-mapper (not shown) that is part of a SONET receiver (not shown). Typically, in such a system, the system clock is a continuously running clock with a uniform rate, but the write enable signal and hence the input data rate will be highly non-uniform and not smooth and typically has a different nominal value than the system clock as discussed above. The elastic store 102 provides a storage fill level 110 that is filtered by digital filter 112 and scaled if necessary to provide a control word 114 to the digitally controllable read enable generator 116. The digitally controllable read enable generator 116 provides a read enable signal at a nominal data rate that may be equal to or related to the input data rate but is more uniform and substantially smooth. The output data rate can be adjusted about the nominal data rate as a function of the control word 114. The system clock 104 runs continuously and is used as the clock to carry both the input and the output data, wherein the output of data from the elastic store 102 is controlled by the read enable signal 108 provided by the digitally controllable read enable generator 116.

In one embodiment in which SONET is used to transfer PDH data via a SONET SPE, the highly non-uniform input data rate is primarily due to the presence of transport overhead (TOH) and the position of data bits and stuff bits in the SONET SPE. The TOH data is not provided as output data since the de-mapper in the SONET receiver only provides a write enable signal when valid data from the SPE is present. Thus, there may be long gaps with no data when TOH data is present. As discussed above, stuff bits may be added to the SPE when mapping PDH data into the SONET SPE to account for different data rates between the PDH data and the SONET data rate. Typically, stuff bits when mapped into the SPE are not valid data and are mapped into known locations. The de-mapper skips over the stuff bits, and a short gap of no data occurs. Accordingly, the elastic store, which is typically not a large memory, does not store unnecessary data such as the TOH data or stuff bits. Typically, when the de-mapper finds valid data in the SPE, the data is input to the elastic store 102 at a rate that exceeds the output data rate and hence, the elastic store may fill up and overflow. Similarly, when no data is present, for example in the TOH data, data is read out of the elastic store at a rate that obviously exceeds the zero input data rate and the elastic store may empty and eventually underflow.

The purpose of the digital filter 112 and the digitally controllable read enable generator 116 is to provide a data output rate of the elastic store more uniform and substantially smoother than the non-uniform data input rate. The digitally controllable read enable generator 116 can vary the nominal rate at which it generates read enable signals by controlling stuff opportunities during the data output in which data bits can be added to the nominal data rate, thereby increasing the data rate, or removed from the nominal rate, thereby decreasing the data rate.

The elastic store is a memory that has a plurality of data storage locations that can be written into and read out of under control of the write enable signal 106 and the read enable signal 118 respectively. The elastic store 102 writes input data received in the data input signal 108 into one or more of the data storage locations only when the write enable signal is present. The elastic store 102 provides a storage level signal 110 that is indicative of the amount of storage space currently holding data. A digital filter 112 receives the storage level signal 110 and filters the storage level signal 110 to provide as an output a control word 114 that is indicative of the storage level signal. The control word can be the average of the storage level signal over a predetermined time period or a value derived from the average or other suitable statistics based on the storage level signal. The digitally controllable read enable generator 116 provides a read enable signal 118 at a nominal data rate to the elastic store 102 that is used by the elastic store 102 to output data stored in the elastic store. The digitally controllable read enable generator 116 receives the control word 114 and is responsive to the control word 114 by varying the read enable signal about the nominal data rate and thereby adjusting the output data rate from the elastic store 102.

The digital filter 112 is a low pass filter that averages out fluctuations in the storage level signal 110 by filtering the high-frequency components to provide the average value of the storage level signal 110, which may be scaled by multiplying it by a predetermined constant, as the control word 114. In one embodiment, the digital filter transfer function has the form of:

$$\frac{(s+\omega_2)}{s\left(\left(\frac{s}{\omega_3}\right)+1\right)}$$

where $\omega_3 > \omega_2$ and are related to the frequency characteristics that specify the required uniformity of the output data. This transfer function includes a low pass filter, an infinite DC gain component, and phase compensation to ensure filter stability. The infinite DC gain component enables the filter to center the elastic store under normal steady state operating conditions. Thus, regardless of the average frequency of the incoming PDH data stream, the elastic store 102 will be filled to one-half the storage level. This maximizes the space available in the elastic store to handle variations in the incoming data rate.

As will be explained in more detail below, when an under-flow or over-flow condition occurs the elastic store 102, which is a circular buffer, typically is re-centered. However, this can lead to problems in filtering the storage fill level 110 of the elastic store 102, which makes it undesirable to re-center the elastic store in the present invention. Accordingly, to avoid the problems associated with re-centering the storage fill level 110, in the present invention the elastic store 102 is a saturating elastic store depicted in FIG. 2. The elastic store 102 depicted in FIG. 2 includes a memory 202 that contains a plurality of data storage locations and read and write logic that manages the data written into and read out of the memory 202. The memory 202 receives the input data signal 108 and the clock signal 104. A write pointer logic module receives the write enable signal 106 and provides a saturating write enable signal 206 and a write pointer 208 to the memory 202 to write the current data into a storage location. The write pointer 208 contains the memory location the data was written to. Similarly, the read enable signal 118 is provided to a read pointer logic module 216 that provides a read pointer 220 to the memory 202 to read the data at the current storage location and to provide this data as output data. The read pointer 220 contains the current memory location that the data was read from. The write pointer 208 and the read pointer 220 are provided to a read/write pointer comparator module 210 that compares the locations of the write and read addresses to determine the fill level of the memory 202.

Figure 2:
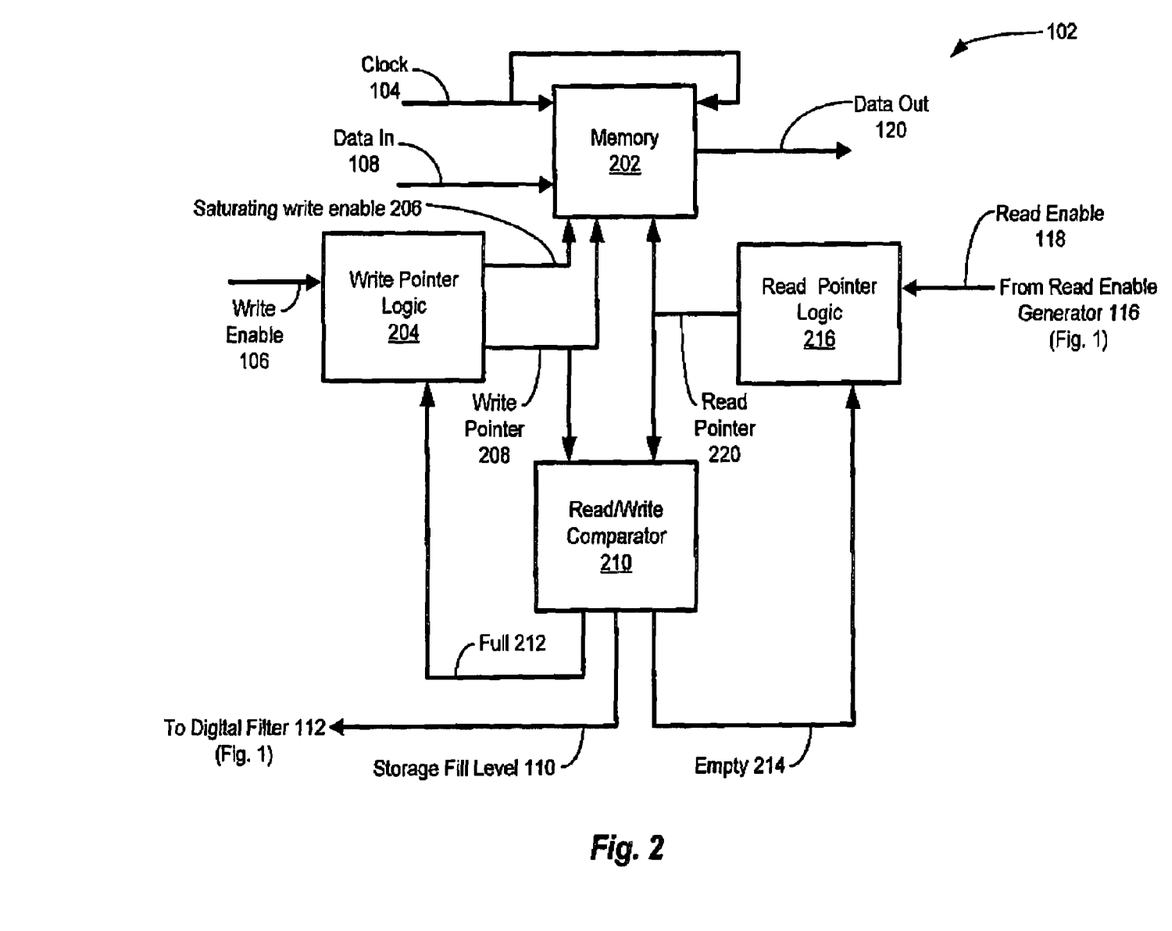
FIG. 2 is a block diagram of an embodiment of the elastic store of FIG. 1 that is a saturating elastic store and compatible with the present invention.

If the write pointer points to an address that is greater than or equal to the address pointed to by the read pointer, an overflow condition occurs. In this event, a "full signal" 212 is provided to the write pointer logic module 204. If the read pointer points to an address that is less than or equal to the address pointed to by the write pointer, an underflow condition occurs. In this event, an "empty signal" 214 is provided to the read pointer logic module 216. In one embodiment, when the write pointer logic module 204 receives the full signal 212, the write pointer logic module ignores the incoming write enable signal 106 and does not advance the write pointer 208. Although some data is lost, large changes to the data rates that would result in this condition are extraordinary and data integrity is not required. Similarly, when the read pointer logic module 216 receives the empty signal 214, the read pointer logic module ignores the incoming read enable signal 118 and does not advance the read pointer 220. Although some data is lost, large changes to the data rates that would result in this condition are extraordinary and data integrity is not required. Advantageously, this technique keeps the digital filter supplied with the necessary data to track the input data rate.

In another embodiment (not shown), the full signal 212 and empty signal 214 are provided to the digitally controlled read enable generator 116. If the read enable generator 116 receives a full signal, it produces additional read enables 118 to prevent an overflow of data in the memory 202. If the read enable generator 116 receives an empty signal, it suppresses some read enables 118 to prevent an underflow of data in the memory 202. As with the previous embodiment, this technique keeps the digital filter supplied with the necessary data to track the input data rate, but the elastic store 102 continues to operate without data loss.

Figure 3:
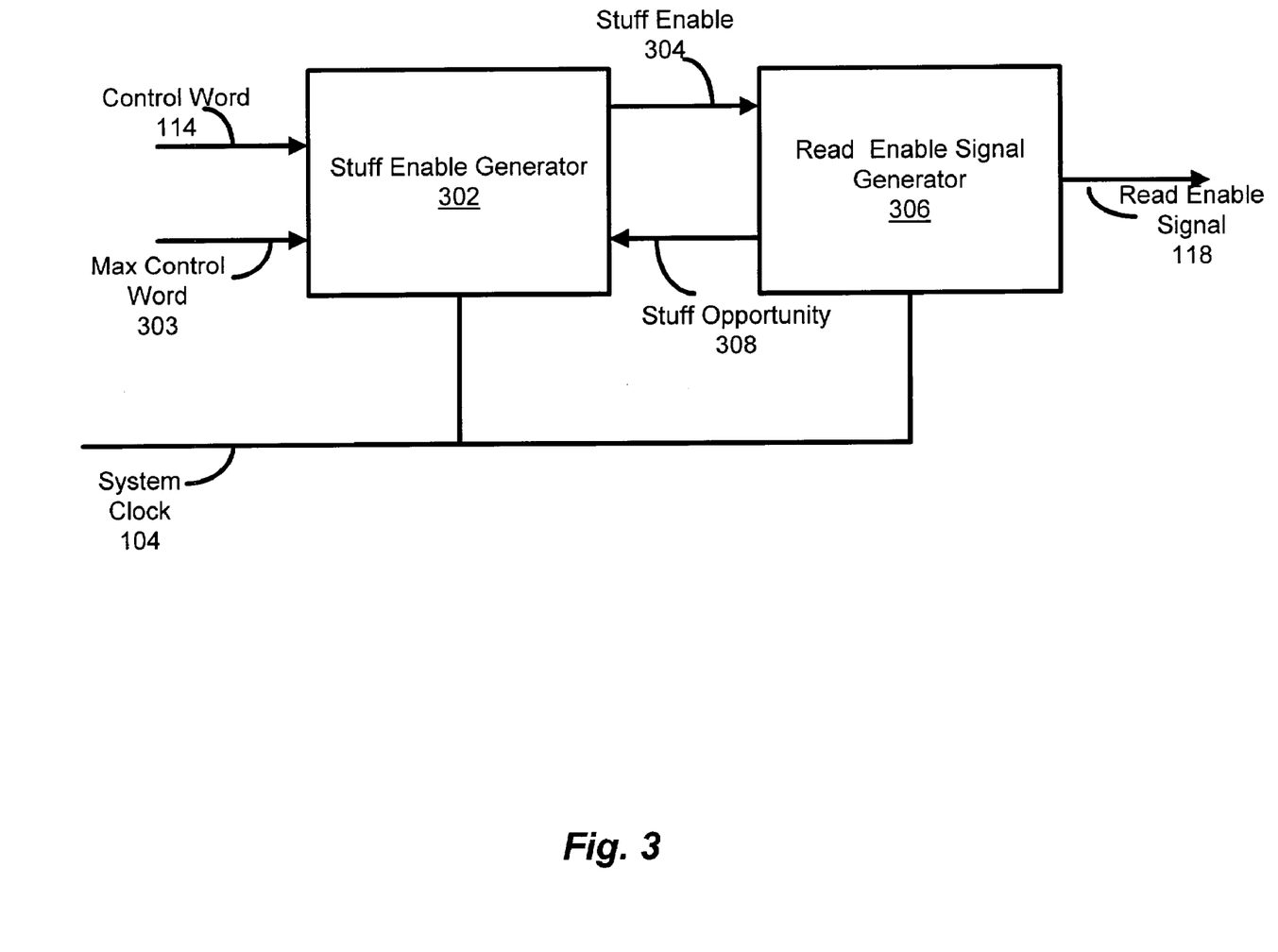
FIG. 3 is a block diagram of the digitally controllable read enable generator of FIG. 1.

FIG. 3 depicts an embodiment of the digitally controllable read enable generator 116. As discussed above, the digitally controllable read enable generator 116 provides a read enable rate at the nominal data rate of the PDH data transported in the SONET SPE and is able to vary the read enable rate about this nominal data rate by inserting data bits or stuff bits at specified locations in the data stream. In particular, FIG. 3 depicts the digitally controllable read enable generator 116 including a stuff enable generator 302 and a read enable signal generator 306. The stuff enable generator 302 receives the control word 114 from the digital filter and a predetermined constant 303 that is the maximum value of the control word 114. The read enable signal generator 306 provides a stuff opportunity signal 308 to the stuff enable generator 302. As will be explained in more detail below, the stuff enable generator provides a stuff enable signal 304 to the read enable signal generator 306 that is a function of the control word 114, the maximum control word 303, and the corresponding stuff opportunity signal 308. The read enable generator 306 uses the stuff enable signal 304 provided by the stuff enable generator 302 to set the read enable signal at the corresponding stuff opportunity time, thereby varying the nominal read enable signal rate.

Figure 4:
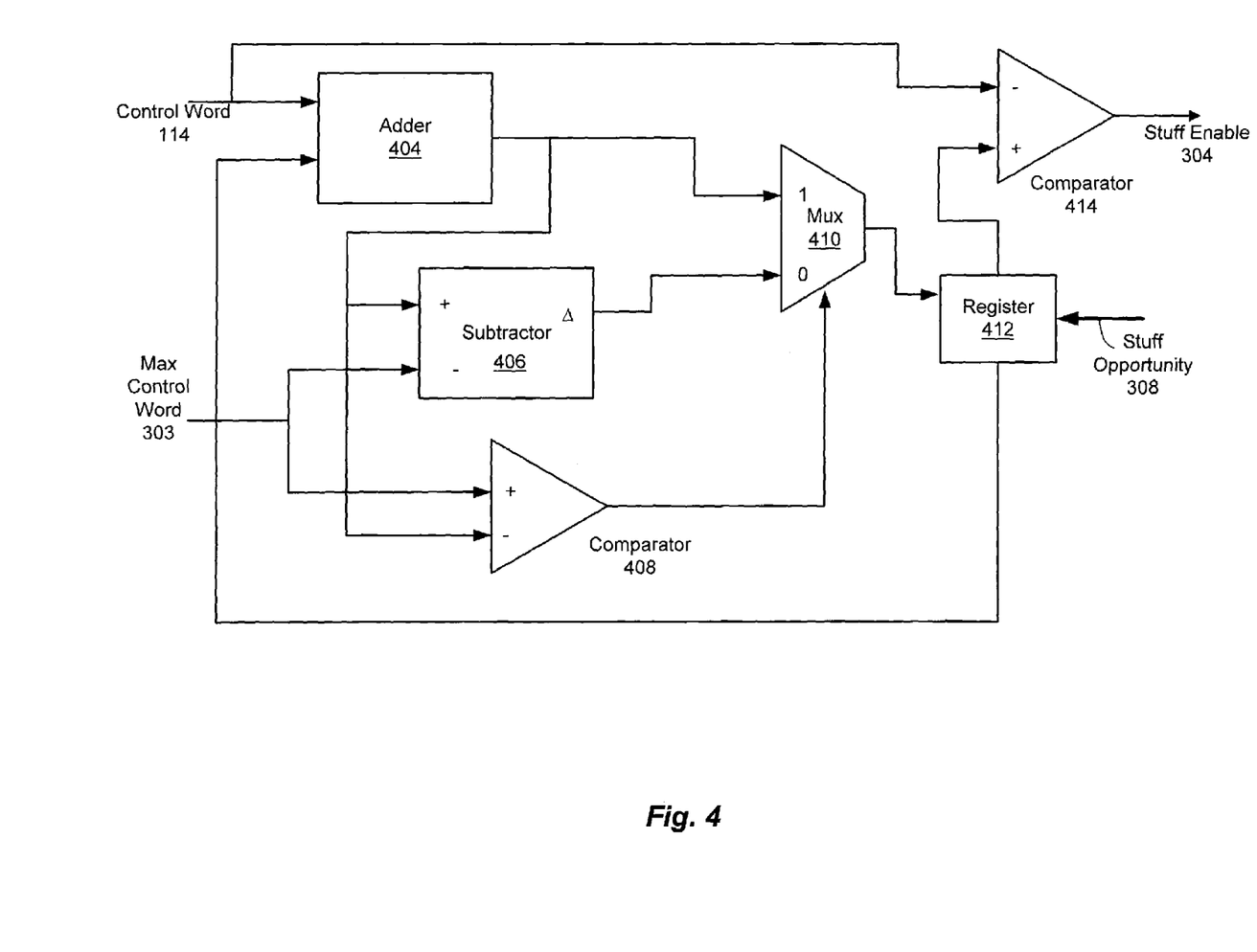
FIG. 4 is a block diagram of the stuff enable generator of FIG. 3.

FIG. 4 depicts an embodiment of a stuff enable generator 302 that is compatible with the present invention. The stuff enable generator 402 depicted in FIG. 4 includes a first adder module 404, a second adder module 406, a first comparator 408, a multiplexer 410, a register 412, and a second comparator 414. The first adder 404 module receives at one of the two inputs the control word 114. The output of the first adder 404 is coupled to a first input of the second adder 406, a second input of the first comparator 408, and a first input of the multiplexer 410. The predetermined constant 303 is coupled to a second input of the second adder 406 as a negative input, and a first input of the first comparator 408. The output of the second adder 406, which is the difference between the output of the first adder and the predetermined constant 303 is provided to the second input of the multiplexer 410. A selection input of multiplexer 410 is coupled to the output of the first comparator 408. The output of multiplexer 410 is provided to the register 412 along with the stuff opportunity signal 308. When the stuff opportunity signal 308 is set, the value provided by the multiplexer 410 is latched into the register 412 and provided as an output. The output of the register 412 is provided to the first input of the second comparator 414 and to the second input of the first adder 404. The control word 114 is provided to the second input of the second comparator 414. The output of the second comparator 414 is the stuff enable signal.

In the embodiment depicted in FIG. 4, the control word 114 is accumulated in register 412 using the first adder 404 until the accumulated total is greater than or equal to the predetermined constant 303, i.e., the maximum value of the control word 114. When the accumulated value exceeds the maximum control word value, only the amount in excess of the maximum value is loaded into the register 412. This is equivalent to a modulo addition function in which the addition of the control word 114 to the existing accumulated value in the register is performed modulo the maximum control word value. This operation provides at the output of the register 412 a sequence of numbers ranging from zero to the maximum control word value. At each stuff opportunity the accumulated value at the output of register 412 is compared to the present value of the control word 114. If the accumulated value in register 412 is less than the control word 114, the stuff enable signal is set such that the read enable signal 118 is set to read data from the memory 202. If the accumulated value in register 412 is greater than or equal to the control word 114, the stuff enable signal is set such that no read enable signal 118 is set and no data is read data from the memory 202. As will be explained in more detail below, the combination of the stuff enable generator 302 and the read enable generator 306 provide a read enable signal 118 whose rate can be varied over a narrow range.

Figure 5:
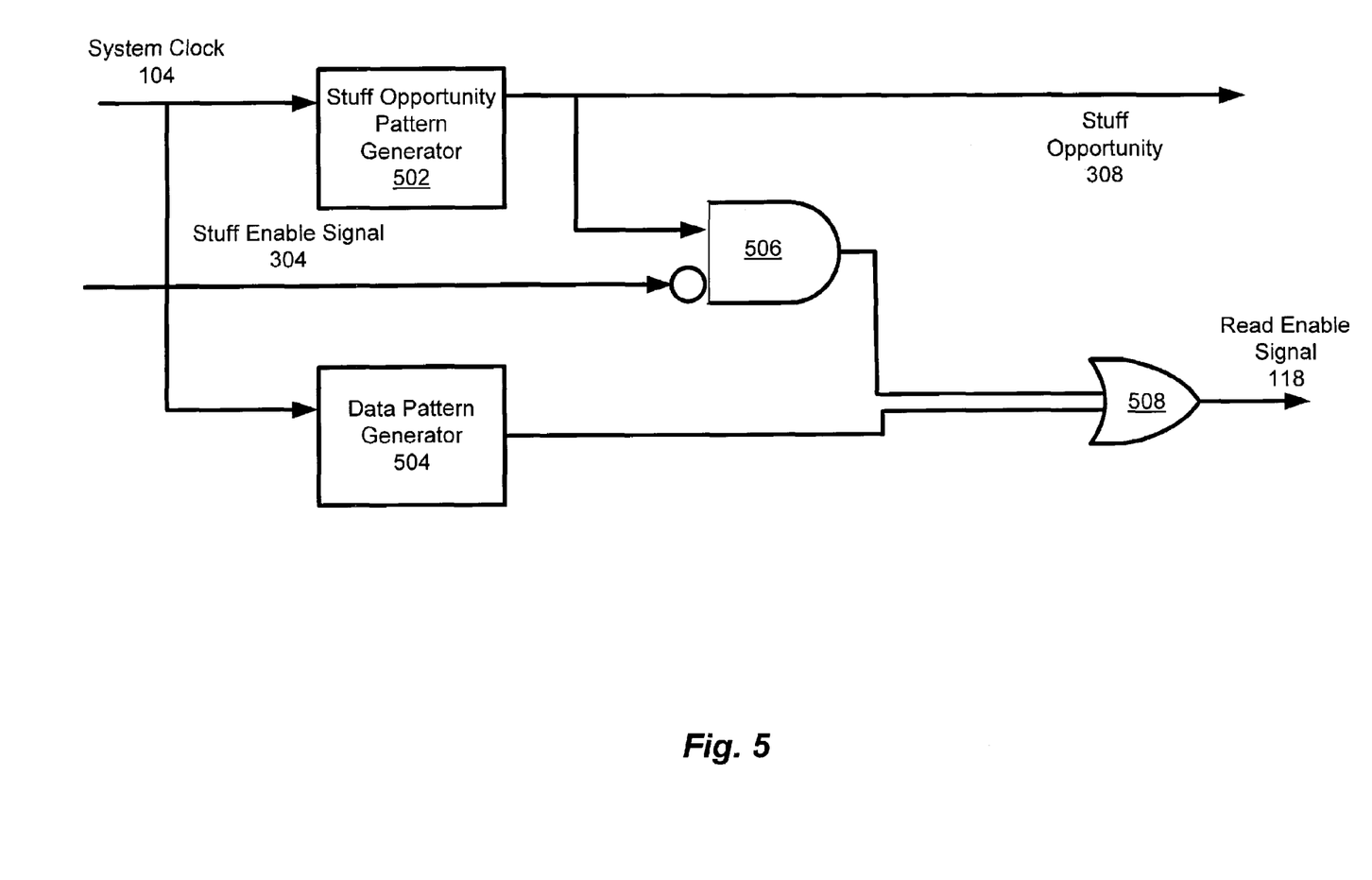
FIG. 5 is a block diagram of the read enable signal generator of FIG. 3.

FIG. 5 depicts an embodiment of the read enable generator 306 that is compatible with the present invention. In particular, the read enable generator 306 depicted in FIG. 5 includes a stuff opportunity pattern generator 502, a data pattern generator 504, an AND gate 506 and an OR gate 508. The stuff opportunity pattern generator 502 is configured to provide an output signal that indicates the presence of a stuff bit in the data stream. As discussed above, stuff bits are used to accommodate the difference in data rates between the message packet and the data transmitted via a message packet. Accordingly, the locations of stuff bits within the message packet are determined by the system requirements and standards of the input data and the message packet system used to transmit the input data. The data pattern generator 504 provides a signal that indicates the location of valid data within the message packet. For example, in a SONET frame, the TOH data is not valid data and would be discarded during processing. The stuff enable signal in the embodiment depicted in FIG. 4 provides a valid stuff bit when the stuff enable signal 304 goes high. Accordingly, the AND gate 506 inverts the input coupled to the stuff enable signal 304. The second input of AND gate 506 is the stuff opportunity signal 308. The output of AND gate 506 is coupled to one input of OR gate 508, and the second input to OR gate 508 is coupled to the output of the data pattern generator 504. Thus, a read enable signal 118 is generated when the stuff enable signal 304 is low and the stuff opportunity signal 308 is high, or when the data pattern generator 504 indicates that valid data is present.

In an embodiment in which SONET is used to transport DS-3 data and E3 data, the DS-3 data has a nominal data rate of 44.736 Mbps, the E3 data has a nominal data rate of 34.368 Mbps, and the system clock runs at 77.76 MHz. If a data bit is output on every system clock cycle, the data rate is 77.76 Mbps. If a data bit is output on every 2 out of 3 system clock cycles, the data rate is 51.84 Mbps. If a data bit is output on every 1 out of 3 system clock cycles, the data rate is 25.95 Mbps. The nominal DS-3 and E3 data rates are between 51.84 Mbps and 25.95 Mbps rates obtained by reading data on every 2 out of 3 system clock cycles and every 1 out of 3 system clock cycles respectively. In this embodiment, the method of determining whether data is read out on 1 out of 3 system clock cycles or 2 out of 3 system clock cycles is a function of the fixed SONET data pattern and the stuff enable signal. In this embodiment, 1 out of 3 system clock cycles will always carry data, 1 out of 3 clock cycles will never carry data, and 1 out of 3 clock cycles may carry data.

Figure 6:
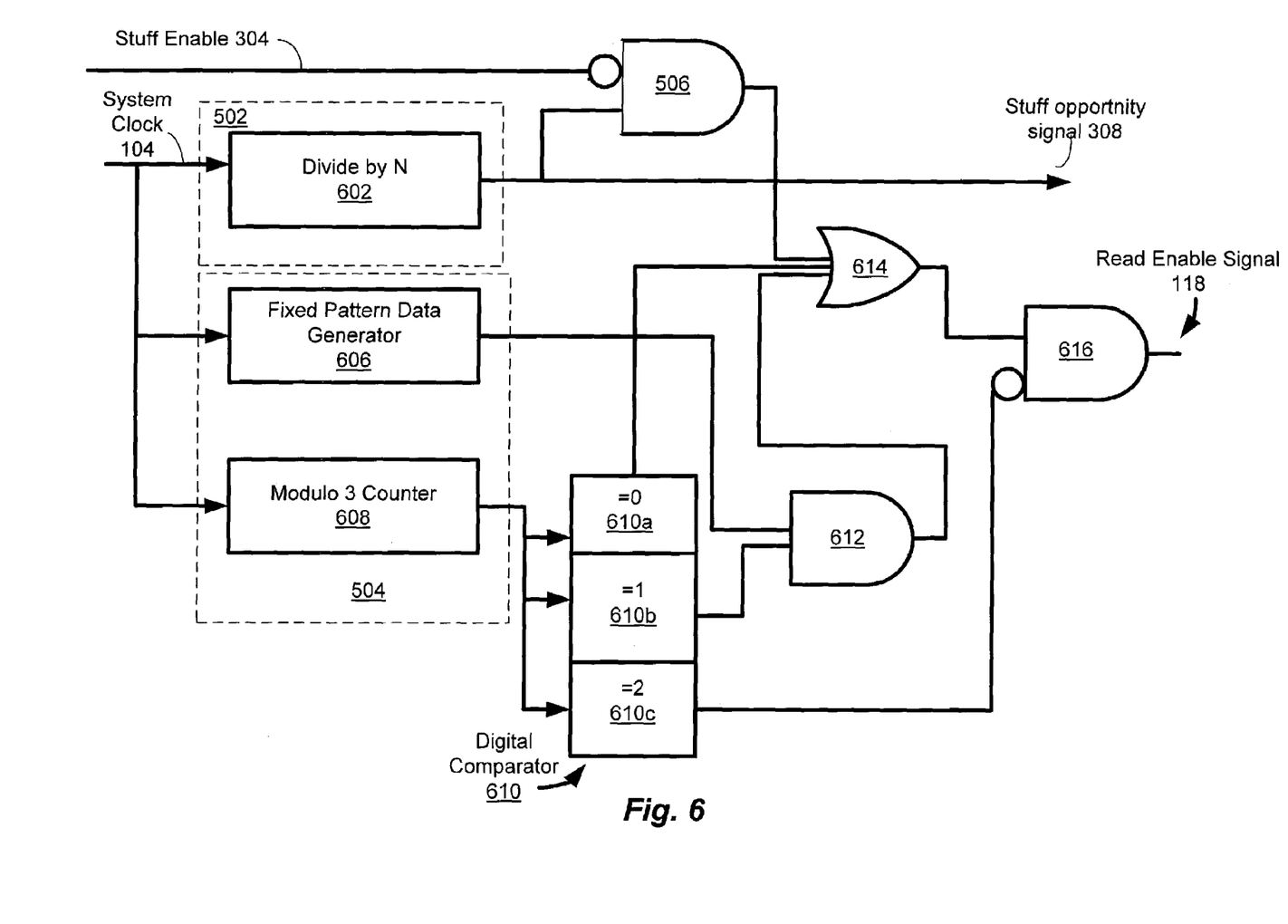
FIG. 6 is a more detailed block diagram of the read enable signal generator of FIG. 5.

FIG. 6 depicts a circuit that is suitable for use with the embodiment described above in which the transported data stream is a DS-3 or E3 data stream and in which the output data rate is maintained through the read enable signal generator depicted in FIG. 6. In particular, FIG. 6 depicts a read enable signal generator that includes an AND gate 506, the stuff opportunity generator 502 includes a divide-by-N counter 602 that is coupled to the input system clock. The data pattern generator 504 includes a fixed pattern generator 606 that includes the data pattern of the SONET message packet and that provides a data signal only when valid data is present. The data pattern generator 504 also includes a modulo 3 counter, i.e., a counter having an output of 0, 1, 2, 0, 1, 2, . . . that is connected to three digital comparators 610a, 610b, and 610c that compare the digital output of the modulo 2 counter with 0, 1, and 2 respectively. Output logic of AND gate 604, AND gate 612, OR gate 614 and AND gate 616 provide the read enable output signal. The read enable generator depicted in FIG. 6 produces an output data rate, i.e., a read enable signal rate, that is nominally equal to the PDH data stream rate, e.g., the DS-3 or E3 data stream. The read enable signal rate is based on the SONET clock signal. Since the SONET clock is not a multiple of the PDH clock, the output data rate would normally be non-uniform when compared to a fully desynchronized PDH data rate. Since the actual PDH data rate can vary within a specified range, the read enable signal generator depicted in FIG. 6 can vary on either side of the nominal PDH data rate through the use of a stuff bit at a predetermined interval.

In the embodiment depicted in FIG. 6, the stuff opportunity bit is generated at a rate that is much lower than the PDH clock and data rate of 44.736 Mbps, but much higher than the low frequencies that define the low pass filter characteristics. In this embodiment, the stuff opportunity is provided at a 10 KHz rate. By providing a stuff bit opportunity at this predetermined rate, the nominal read enable signal can be varied in a narrow range about the nominal PDH output rate. As depicted in FIG. 6 for a DS-3 case, the divide-by-N counter provides a stuff opportunity at the 10 KHz rate. If a data bit were sent out on each stuff opportunity, the read enable signal would have a rate of 44.74 MHz and if a data bit is never sent out on stuff opportunity bit then the read enable signal would have a rate of 44.73 MHz. In this embodiment, the control word is scaled to be between 0 and 10000, with 0 being equal to the low rate of 44.730 MHz and 10000 being equal to the 44.74 MHz rate and 6000 being equal to the nominal DS-3 rate of 44.736 MHz.

In another embodiment in which SONET is used to transport DS-3 and E3 data, the data pattern generator 504 depicted in FIG. 5 provides a standard mapping of DS-3 and E3 data into a SONET SPE. The standard mapping for DS-3 and E3 into SONET is described in GR-253-CORE and ITU-T recommendation G.707/Y.1322 (August 2002), "Network node interface for the Synchronous Digital Hierarchy (SDH)", respectively. Both the DS-3 and E3 mappings consist of fixed data and stuff locations with multiple stuff opportunities within the SONET SPE. The stuff opportunity pattern generator 502 would produce a pattern of stuff opportunities in compliance with the mapping of the DS-3 or E3 data into SONET. In this embodiment, the system would produce a standard SONET mapping with a smooth pattern of stuff bits resulting in low jitter and wander in the extracted data signal.

It should be appreciated that other variations to and modifications of the above-described jitter and wander apparatus may be made without departing from the inventive concepts described herein. Accordingly, the invention should not be viewed as limited except by the scope and spirit of the appended claims.

What is claimed is:

1. An apparatus for receiving input data and a write enable signal at a non-uniform first write data rate and for providing output data at a substantially uniform second read data rate, the apparatus comprising:

a saturating elastic store having a plurality of data storage locations, the saturating elastic store receiving the input data and the write enable signal, the saturating elastic store operative to store input data concurrent with the write enable signal at one of said plurality of data storage locations, the saturating elastic store further operative to provide a data storage level signal indicative of the number of data storage locations currently used;

a digital filter having a transfer function coupled to the saturating elastic store and receiving said data storage level signal, said digital filter operative to filter said data storage level and to provide the filtered data storage level signal as an output control word; and a digitally controlled read enable generator providing a read enable signal at the second read data rate, the digitally controlled read enable generator coupled to the digital filter and receiving as an input said control word from said digital filter, said digitally controlled read enable generator responsive to said control word by varying said read enable signal from said second read data rate, said digitally controlled read enable generator further coupled to the saturating elastic store and providing the read enable signal to the saturating elastic store, wherein said saturating elastic store is further operative to read data stored at one of said plurality of storage locations and to provide said read data as an output concurrently with said read enable signal, and wherein at least one of said saturating elastic store and said digitally controlled read enable generator is further operative:

in the event substantially all of said plurality of data storage locations within said saturating elastic store are currently being used, to vary at least one of said write data rate and said read data rate to prevent an overflow condition of said saturating elastic store; and in the event substantially none of said plurality of data storage locations within said saturating elastic store is currently being used, to vary at least one of said write data rate and said read data rate to prevent an underflow condition of said saturating elastic store, wherein the digitally controlled read enable generator includes;

a stuff enable generator for providing a stuff enable signal, the stuff enable generator coupled to the digital filter and receiving the control word therefrom;

a read enable signal generator for providing read enable signals at the second data rate, the read enable signals including data stuff opportunities interspersed between the read enable signals, the data stuff opportunities allowing for the adjustment of the nominal read data rate by providing an opportunity for an additional read enable signal during a corresponding stuff opportunity, the read enable signal generator also providing the stuff opportunities to the stuff signal generator;

the stuff enable generator providing a stuff enable signal to the read enable generator as a function of the control word and the corresponding stuff opportunity, wherein the read enable signal generator is responsive to the stuff enable signal by providing an additional read enable signal at the corresponding stuff opportunity, and wherein the stuff enable generator includes:

a first adder having a first input receiving the control word front the digital filter and providing an output;

a second adder having a positive input coupled to the first output and a negative input coupled to a predetermined constant equal to a max control word value, the second adder operative to provide an output of the difference between the first output and the predetermined constant;

a first comparator having a first comparator input coupled to the output of the first adder and a second comparator input coupled to the predetermined constant, the comparator operative to provide an output indicative of the relative magnitude of the two inputs;

a multiplexer having a first mux input coupled to the output of the first adder and receiving the first output therefrom and a second mux input coupled to the output of the second adder and a selection input coupled to the output of the first comparator, wherein the multiplexer is operative to provide as an output the first mux input when the first comparator input is greater than the second comparator input and to provide as an output the second mux input when the when the second comparator input is greater than the first comparator input;

a register having an input coupled to the multiplexer output for storing the output of the multiplexer, and for providing the output of the multiplexer as an output, the output of the register being coupled to a second input of the first adder and a first comparator input of a second comparator and a second comparator input of the second comparator being coupled to the control word, the output of the second comparator providing the stuff enable signal when the second comparator input of the second comparator is less than the first comparator input of the second comparator.

2. The apparatus of claim 1 wherein the transfer function of the digital filter is a low pass filter.

3. The apparatus of claim 2 wherein the low pass filter transfer function has the form of $$\frac{(s+\omega_2)}{s\left(\left(\frac{s}{\omega_3}\right)+1\right)}$$

where $\omega_3 > \omega_2$.

4. The apparatus of claim 1 wherein said saturating elastic store is further operative, in the event substantially all of said plurality of data storage locations within said saturating elastic store are currently being used, to ignore at least one write enable signal, thereby reducing said write data rate to prevent an overflow condition of said saturating elastic store.

5. The apparatus of claim 1 wherein said saturating elastic store is further operative, in the event substantially none of said plurality of data storage locations within said saturating elastic store is currently being used, to ignore at least one read enable signal thereby reducing said read data rate to prevent an underflow condition of said saturating elastic store.

6. The apparatus of claim 1 wherein said digitally controlled read enable generator is further operative, in the event substantially all of said plurality of data storage locations within said saturating elastic store are currently being used, to provide at least one additional read enable signal, thereby increasing said read data rate to prevent an overflow condition of said saturating elastic store.

7. The apparatus of claim 1 wherein said digitally controlled read enable generator is further operative, in the event substantially none of said plurality of data storage locations within said saturating elastic store is currently being used, to suppress at least one read enable signal, thereby reducing said read data rate to prevent an underflow condition of said saturating elastic store.

8. An apparatus for receiving input data and a write enable signal at a non-uniform first write data rate and for providing output data at a substantially uniform second read data rate, the apparatus comprising:
a saturating elastic store having a plurality of data storage locations, the saturating elastic store receiving the input data and the write enable signal, the saturating elastic store operative to store input data concurrent with the write enable signal at one of said plurality of data storage locations, the saturating elastic store further operative to provide a data storage level signal indicative of the number of data storage locations currently used;
a digital filter having a transfer function coupled to the saturating elastic store and receiving said data storage level signal, said digital filter operative to filter said data storage level and to provide the filtered data storage level signal as an output control word; and
a digitally controlled read enable generator providing a read enable signal at the second read data rate, the digitally controlled read enable generator coupled to the digital filter and receiving as an input said control word from said digital filter, said digitally controlled read enable generator responsive to said control word by varying said read enable signal from said second read data rate, said digitally controlled read enable generator further coupled to the saturating elastic store and providing the read enable signal to the saturating elastic store,
wherein said saturating elastic store is further operative to read data stored at one of said plurality of storage locations and to provide said read data as an output concurrently with said read enable signal, and
wherein at least one of said saturating elastic store and said digitally controlled read enable generator is further operative:
in the event substantially all of said plurality of data storage locations within said saturating elastic store are currently being used, to vary at least one of said write data rate and said read data rate to prevent an overflow condition of said saturating elastic store; and
in the event substantially none of said plurality of data storage locations within said saturating elastic store is currently being used, to vary at least one of said write data rate and said read data rate to prevent an underflow condition of said saturating elastic store, and
wherein the saturating elastic store includes:
a memory having a plurality of storage locations for storing data, the memory being coupled to the data input;
a write pointer logic being coupled to the write enable signal and providing a saturating write enable signal to the memory and providing a write pointer;
a read pointer logic module coupled to the read enable signal and providing a read pointer;
a read/write pointer comparator coupled to the write pointer logic module and the read pointer logic module and receiving the write pointer and the read pointer, the read/write pointer comparator operative to compare the write pointer and the read pointer and to provide a full signal when after writing current data to memory the write pointer is greater than or equal to the read pointer and an empty signal if after reading the current memory and providing as an output, the read pointer is less than or equal to the write pointer;
the write pointer coupled to the read/write pointer comparator and responsive to said full signal by not providing a saturating write enable signal to the memory while the full signal is active;
the read pointer coupled to the read/write pointer comparator and responsive to said empty signal by not advancing the read pointer to the memory while the empty signal is active.

9. An apparatus for receiving input data and a write enable signal at a non-uniform first write data rate and for providing output data at a substantially uniform second read data rate, the apparatus comprising:
a saturating elastic store having a plurality of data storage locations, the saturating elastic store receiving the input data and the write enable signal, the saturating elastic store operative to store input data concurrent with the write enable signal at one of said plurality of data storage locations, the saturating elastic store further operative to provide a data storage level signal indicative of the number of data storage locations currently used;
a digital filter having a transfer function coupled to the saturating elastic store and receiving said data storage level signal, said digital filter operative to filter said data storage level and to provide the filtered data storage level signal as an output control word; and
a digitally controlled read enable generator providing a read enable signal at the second read data rate, the digitally controlled read enable generator coupled to the digital filter and receiving as an input said control word from said digital filter, said digitally controlled read enable generator responsive to said control word by varying said read enable signal from said second read data rate, said digitally controlled read enable generator further coupled to the saturating elastic store and providing the read enable signal to the saturating elastic store, wherein said saturating elastic store is further operative to read data stored at one of said plurality of storage locations and to provide said read data as an output concurrently with said read enable signal, and wherein at least one of said saturating elastic store and said digitally controlled read enable generator is further operative:

in the event substantially all of said plurality of data storage locations within said saturating elastic store are currently being used, to vary at least one of said write data rate and said read data rate to prevent an overflow condition of said saturating elastic stoke; and in the event substantially none of said plurality of data storage locations within said saturating elastic store is currently being used, to vary at least one of said write data rate and said read data rate to prevent an underflow condition of said saturating elastic store, and wherein the saturating elastic store includes:

a memory having a plurality of storage locations for storing data, the memory being coupled to the data input and to a system clock;

a write pointer logic being coupled to the write enable signal and providing a saturating write enable signal to the memory and providing a write pointer;

a read pointer logic module coupled to the read enable signal and providing a read pointer;

a read/write pointer comparator coupled to the write pointer logic module and the read pointer logic module and receiving the write pointer and the read pointer, the read/write pointer comparator operative to compare the write pointer and the read pointer and to provide a full signal when after writing current data to memory the write pointer is greater than or equal to the read pointer and an empty signal if after reading the current memory and providing as an output, the read pointer is less than or equal to the write pointer;

a digitally controlled read enable generator which receives the full and empty signals from the read/write pointer comparator, and is operative to produce additional read enables when the full signal is active, and to produce fewer read enables when the empty signal is active.

* * * * *

UNITED STATES PATENT AND TRADEMARK OFFICE
CERTIFICATE OF CORRECTION

| | | |
|---|---|---|
| PATENT NO. | : 7,212,599 B2 | Page 1 of 1 |
| APPLICATION NO. | : 10/346550 | |
| DATED | : May 1, 2007 | |
| INVENTOR(S) | : Ravi Subrahmanyan et al. | |

It is certified that error appears in the above-identified patent and that said Letters Patent is hereby corrected as shown below:

Column 10, claim 1, line 32, "front" should read --from--; and

Column 13, claim 9, line 21, "elastic stoke" should read --elastic store--.

Signed and Sealed this

Sixth Day of November, 2007

JON W. DUDAS
*Director of the United States Patent and Trademark Office*